US010343600B2

(12) United States Patent
Verwys et al.

(10) Patent No.: US 10,343,600 B2
(45) Date of Patent: Jul. 9, 2019

(54) ILLUMINATION OF A VEHICLE STORAGE COMPARTMENT THROUGH ELECTROLUMINESCENT MATERIAL

(71) Applicant: Honda Motor Co., Ltd., Tokyo (JP)

(72) Inventors: Nichole A. Verwys, Marysville, OH (US); Zachary Segraves, Redwood City, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/639,306

(22) Filed: Jun. 30, 2017

(65) Prior Publication Data
US 2019/0001876 A1 Jan. 3, 2019

(51) Int. Cl.
B60Q 3/225 (2017.01)
B60Q 3/74 (2017.01)
B60Q 3/51 (2017.01)
B60Q 3/54 (2017.01)
B60Q 3/57 (2017.01)

(52) U.S. Cl.
CPC ............... B60Q 3/225 (2017.02); B60Q 3/51 (2017.02); B60Q 3/54 (2017.02); B60Q 3/57 (2017.02); B60Q 3/745 (2017.02)

(58) Field of Classification Search
CPC .......... B60Q 3/745; B60Q 3/20; B60Q 3/225; B60Q 3/54
See application file for complete search history.

(56) References Cited

U.S. PATENT DOCUMENTS

| 3,185,650 A | 5/1965 | Gurnee et al. |
| 4,663,214 A | 5/1987 | Coburn, Jr. |
| 4,934,753 A | 6/1990 | Gajewski |
| 5,321,069 A | 6/1994 | Owens |
| 5,336,965 A | 8/1994 | Meyer et al. |
| 5,339,550 A | 8/1994 | Hoffman |
| 5,434,013 A | 7/1995 | Fernandez |
| 5,593,782 A | 1/1997 | Budd |
| 6,123,871 A | 9/2000 | Carroll |
| 6,517,226 B1 | 2/2003 | Zimmermann et al. |

(Continued)

FOREIGN PATENT DOCUMENTS

| CN | 202071757 U | 12/2011 |
| DE | 10319396 | 11/2004 |

(Continued)

OTHER PUBLICATIONS

Internet Website: http://www.wranglerforum.com/f274/interior-paint-job-212857.html; regarding blog entitled "Interior paint job?" by Jakebar777 and Darkfire.

(Continued)

Primary Examiner — Robert J May
(74) Attorney, Agent, or Firm — Rankin, Hill & Clark LLP

(57) ABSTRACT

An electroluminescent assembly for a vehicle storage compartment and a method for installing the same on a vehicle storage compartment includes a transparent panel and a door, each at least partially defining the storage compartment. Light emitted by the electroluminescent assembly illuminates the interior of the storage compartment, and is also transmitted through the transparent panel to thereby illuminate a portion of the vehicle that is at an exterior of the storage compartment.

20 Claims, 7 Drawing Sheets

(56) References Cited

U.S. PATENT DOCUMENTS

| | | | |
|---|---|---|---|
| 6,561,667 B2 | 5/2003 | Stapf | |
| 6,616,312 B2 | 9/2003 | Carter | |
| 6,641,276 B1 | 11/2003 | Macher et al. | |
| 6,673,437 B2 | 1/2004 | Kohla et al. | |
| 6,758,510 B1 | 7/2004 | Starling | |
| 7,118,239 B2 | 10/2006 | Itoh et al. | |
| 7,195,381 B2 | 3/2007 | Lynam et al. | |
| 7,210,829 B2 | 5/2007 | Yasuaki Okazaki et al. | |
| 7,234,850 B2 | 6/2007 | Garcia et al. | |
| 7,237,933 B2 | 6/2007 | Radu et al. | |
| 8,016,465 B2 | 9/2011 | Egerer et al. | |
| 8,106,578 B2 | 1/2012 | Brown et al. | |
| 8,113,695 B2 | 2/2012 | Meinke et al. | |
| 8,162,520 B2 * | 4/2012 | Penner | B60N 3/101 |
| | | | 362/154 |
| 8,256,945 B2 | 9/2012 | Choquet | |
| 8,333,492 B2 | 12/2012 | Dingman et al. | |
| 8,339,252 B2 | 12/2012 | Ozaki | |
| 8,345,095 B2 | 1/2013 | Oizumi et al. | |
| 8,408,766 B2 | 4/2013 | Wilson et al. | |
| 8,456,082 B2 | 6/2013 | Stiles et al. | |
| 8,469,562 B2 | 6/2013 | Marzorati et al. | |
| 8,470,388 B1 | 6/2013 | Zsinko et al. | |
| 9,067,556 B2 | 6/2015 | Bosch et al. | |
| 9,315,148 B2 | 4/2016 | Schwenken et al. | |
| 2004/0090317 A1 | 5/2004 | Rothkop | |
| 2004/0110026 A1 | 6/2004 | Richards et al. | |
| 2005/0190570 A1 | 9/2005 | Roessler | |
| 2006/0034092 A1 | 2/2006 | Okazaki et al. | |
| 2006/0097633 A1 | 5/2006 | Cho et al. | |
| 2009/0129107 A1 | 5/2009 | Egerer et al. | |
| 2009/0219468 A1 | 9/2009 | Barton et al. | |
| 2009/0251917 A1 | 10/2009 | Wollner et al. | |
| 2010/0265731 A1 | 10/2010 | Van Herpen et al. | |
| 2010/0283007 A1 | 11/2010 | Robinson | |
| 2010/0302020 A1 | 12/2010 | Lenneman et al. | |
| 2010/0321946 A1 | 12/2010 | Dingman et al. | |
| 2012/0001406 A1 | 1/2012 | Paxton et al. | |
| 2014/0376243 A1 | 12/2014 | Schwenke et al. | |
| 2015/0165964 A1 | 6/2015 | Mori | |
| 2016/0280128 A1 * | 9/2016 | Cannon | B60R 13/0262 |
| 2016/0288709 A1 | 10/2016 | Nespolo et al. | |
| 2017/0246989 A1 * | 8/2017 | Ben Abdelaziz | B60Q 3/20 |
| 2018/0009393 A1 | 1/2018 | Nagashima | |
| 2018/0218611 A1 | 8/2018 | Nagura | |

FOREIGN PATENT DOCUMENTS

| | | |
|---|---|---|
| EP | 1053910 | 2/2003 |
| EP | 1188615 | 6/2004 |
| EP | 1625971 | 2/2006 |
| GB | 2495964 | 5/2013 |
| JP | 2006137227 | 6/2006 |
| WO | 2003061351 | 7/2003 |
| WO | 20080169978 | 2/2008 |

OTHER PUBLICATIONS

Internet Website: http://www.autoblog.com/2004/08/04/volvo-invents-blis-blind-spot-info-system-actual-happiness/, auto blog, by Christopher Diken, Aug. 4, 2004.

Internet Website: http://www.dedona.com/blind-spot-monitoring-and-alert-systems/, DeDona Tint & Sound, Nov. 5, 2013.

Office Action of U.S. Appl. No. 15/429,858 dated Jul. 5, 2018, 11 pages.

Office Action of U.S. Appl. No. 15/639,357 dated Jan. 4, 2019, 21 pages.

Office Action of U.S. Appl. No. 15/639,357 dated Aug. 27, 2018, 29 pages.

NOA of U.S. Appl. No. 15/639,734 dated Apr. 10, 2019, 33 pages.

* cited by examiner

ILLUMINATION OF A VEHICLE STORAGE COMPARTMENT THROUGH ELECTROLUMINESCENT MATERIAL

BACKGROUND

Attempts have been made to illuminate storage compartments of vehicles. One difficulty when illuminating storage compartments is that the lighting fixture occupies space within the storage compartment and only illuminates the interior of the storage compartment.

SUMMARY

According to one aspect, a storage compartment of a vehicle comprises a transparent panel at least partially defining the storage compartment, a door movable between an open position allowing access to an interior of the storage compartment, and a closed position; and an electroluminescent assembly disposed on the transparent panel that emits light when activated. Light emitted by the electroluminescent assembly illuminates the interior of the storage compartment, and is transmitted through the transparent panel to thereby illuminate a portion of the vehicle that is exterior of the storage compartment.

According to another aspect, a method of installing an electroluminescent feature on a storage compartment for a vehicle includes providing a vehicle with a storage compartment having a transparent panel and a door movable between an open position allowing access to an interior of the storage compartment and a closed position. The method includes providing an electroluminescent assembly having two major light emitting surfaces that are oppositely directly from each other and emit light upon activation of the at least one electroluminescent assembly. The electroluminescent assembly is mounted relative to the transparent panel such that light emitted from the at least one electroluminescent assembly illuminates the interior of the storage compartment, and is transmitted through the transparent panel to illuminate a portion of the vehicle that is exterior of the storage compartment.

DETAILED DESCRIPTION

Figure 1:
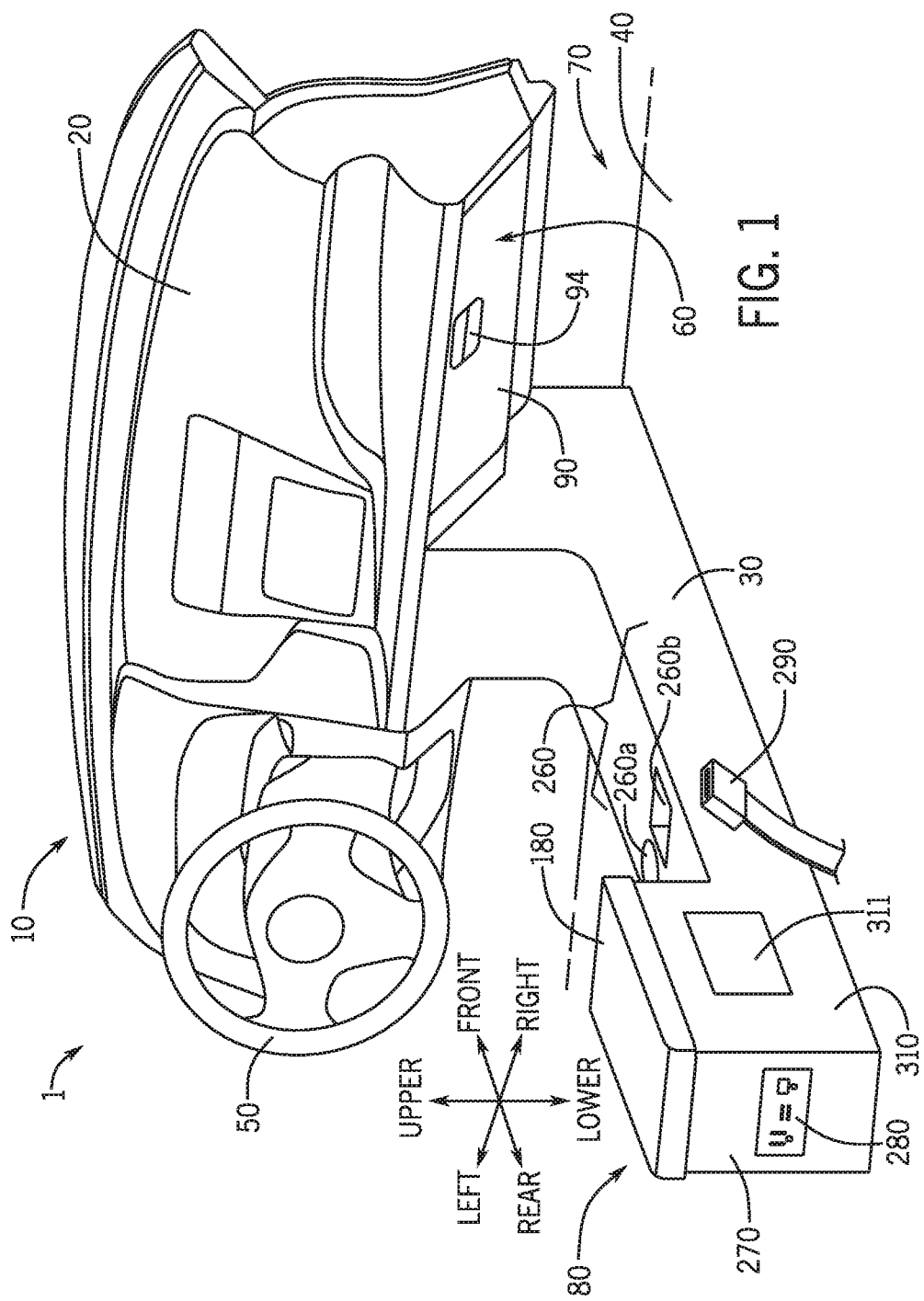
FIG. 1 is a perspective schematic view of a vehicle interior having storage compartments.

Referring now to the figures wherein the showings are for purposes of illustrating one or more embodiments only and not for purposes of limiting the same, FIG. 1 schematically illustrates a passenger compartment 10 of a vehicle 1. The passenger compartment 10 includes one or more storage compartments 60, 80 on which at least one exemplary luminescent assembly can be provided. The illumination mechanism of the assembly is not limited in any way. Illustrative examples include a light emitting diode and an organic light-emitting diode configured in a film or sheet. In a non-limiting example, the luminescent assembly is an electroluminescent assembly. The electroluminescent assembly may be configurable in the form of a flexible film or coating, so that it can be conformed to the contours and shape of a substrate to which it is mated, which substrate may include complex curves. As will be described in more detail herein, the at least one electroluminescent assembly comprises a thin sheet-like structure having two major surfaces that are oppositely directed from one another. In several embodiments, both of the two major surfaces emit light, and therefore light emitted from the two major light emitting surfaces propagates in opposite directions away from the at least one electroluminescent assembly. In an alternative embodiment, only one of the two major surfaces of the at least one electroluminescent assembly is a light emitting surface, and the other of the two major surfaces is not a light emitting surface. In this alternative embodiment, light emitted from the one major light emitting surface propagates away from only one side of the at least one electroluminescent assembly.

In several embodiments, the at least one electroluminescent assembly is activated to emit light by one or more of i) movement of a storage compartment door between the open and closed positions, ii) a passenger being within a passenger compartment of the vehicle, iii) operation of the vehicle, iv) movement of a vehicle passenger door between open and closed positions, and v) proximity of a passenger relative to the at least one electroluminescent assembly.

The passenger compartment 10 is shown in FIG. 1 with directional indicators (arrows), wherein the arrows point in front, rear, left, right, upper, and lower directions. The front direction corresponds to the direction that the front of the vehicle is facing; the left direction corresponds to a driver's side of the vehicle 1 (as is conventional in the United States), and the right direction corresponds to a passenger's side of the vehicle 1. As will be appreciated, the vehicle includes body components, including for example, a roof, passenger doors, and side panels, such that the passenger compartment 10 is in an interior of the vehicle 1. Alternatively, the vehicle may be free of one or more of a roof, passenger doors, and side panels, such as with a motorcycle or golf cart, whereby the passenger compartment 10 is not in an interior of the vehicle 1.

The passenger compartment 10 includes a dashboard 20 at the front, a center console 30 in the middle and splitting the left and right sides of the vehicle 1, and a floor 40 at the lower portion of the vehicle 1. The dashboard 20 includes a steering wheel 50 for a driver occupant of the vehicle 1 to control an operational direction of the vehicle 1. The dashboard 20 also includes a dashboard storage compartment 60, which will also be referred to herein as glove box 60, on the side of the vehicle 1 opposite the steering wheel 50. As depicted, the glovebox 60 is positioned on a lower right side of the dashboard 20 and over a footwell 70. The center console 30 includes a center console storage compartment 80. The center console storage compartment 80 may be positioned at a rear side of the center console 30, as shown, but such position with respect to the center console 30 is not required and may be positioned anywhere along a length of the center console 30.

Figure 2:
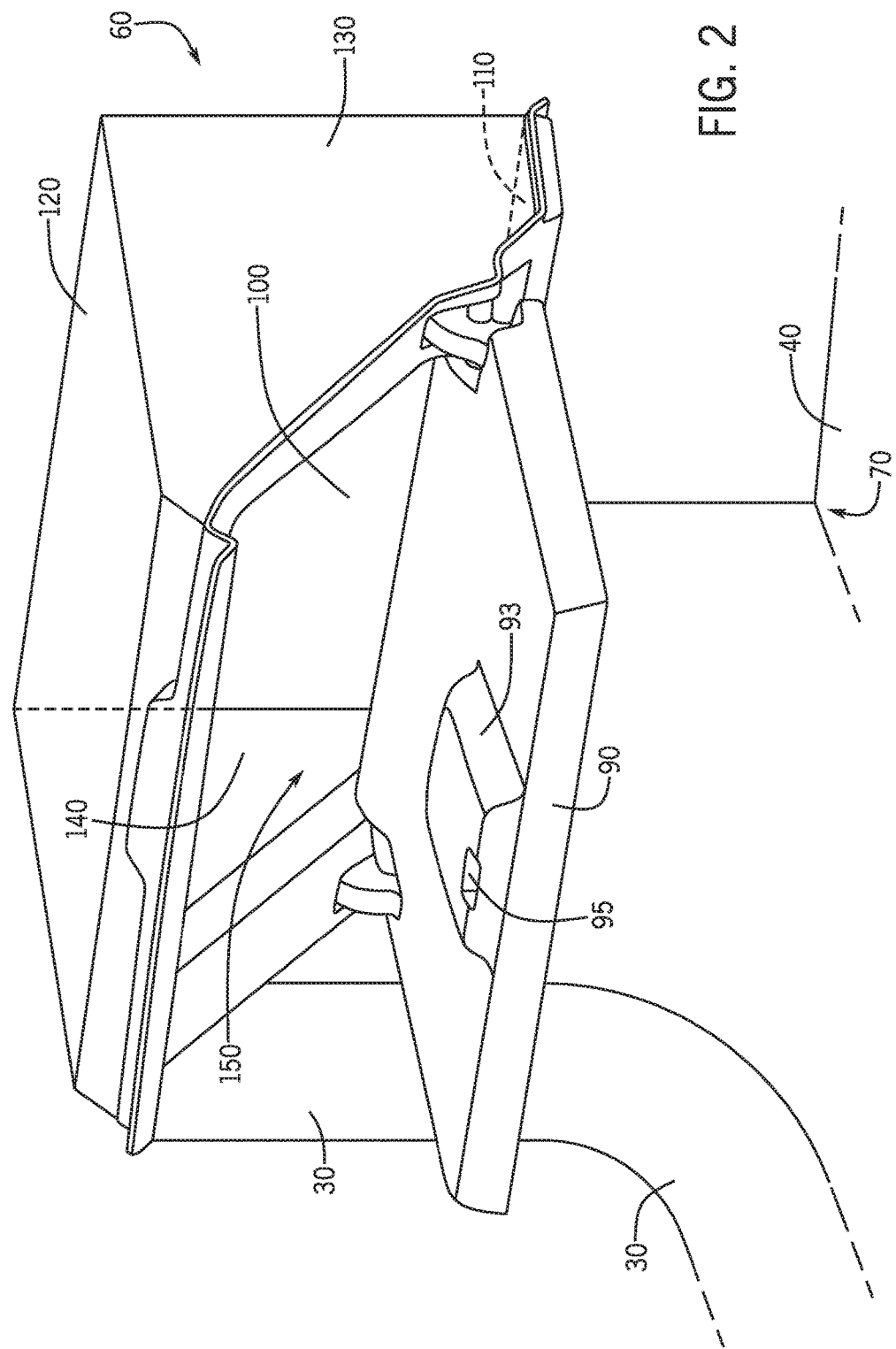
FIG. 2 is a perspective view of the vehicle interior of FIG. 1 showing a dashboard storage compartment with its door in an open position.
Figure 3:
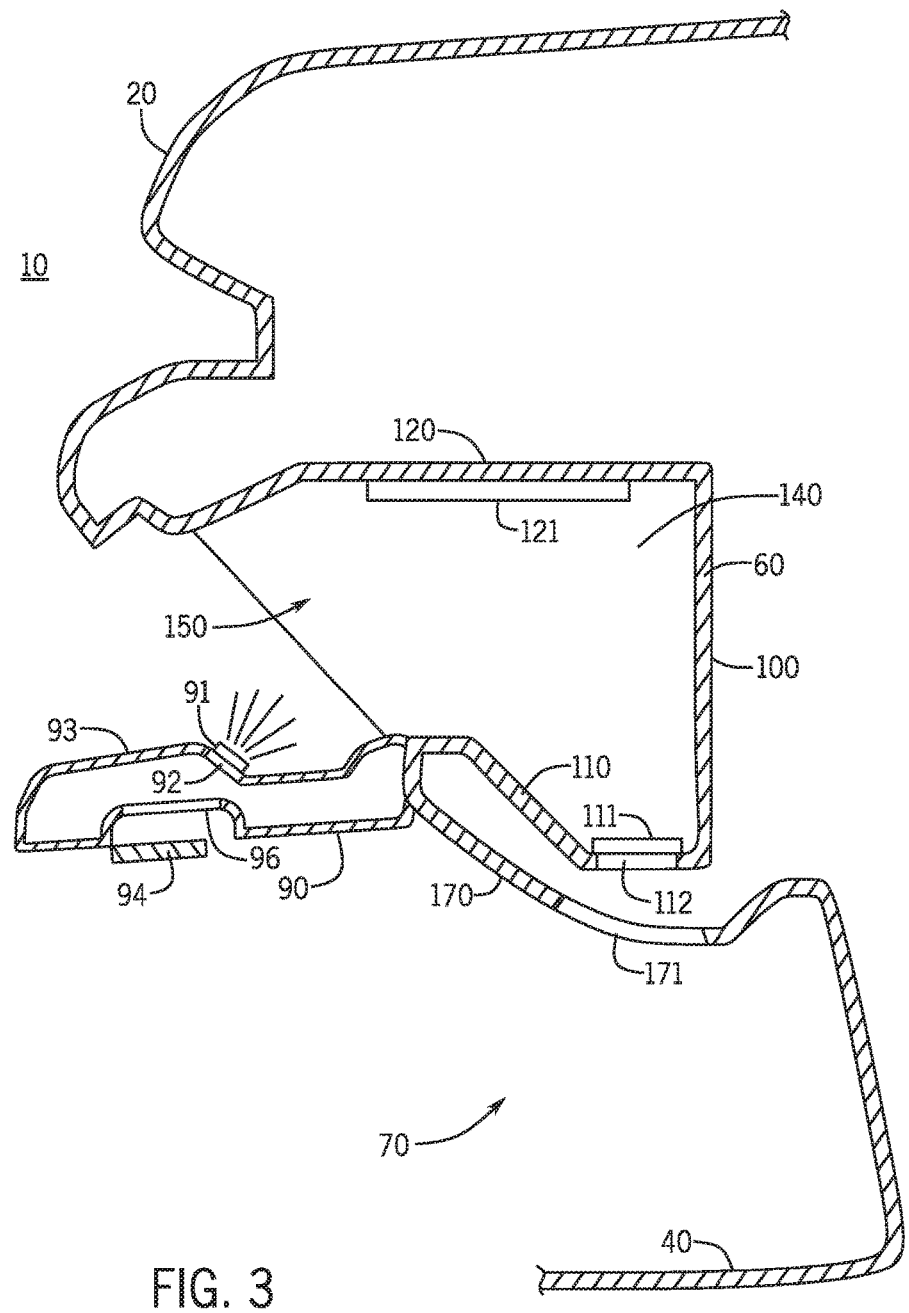
FIG. 3 is a right side cross-sectional view of the dashboard storage compartment of FIG. 2.

With additional reference to FIGS. 2-3, the glove box 60 includes a door 90, a front wall 100 opposite the door 90, a lower wall 110, an upper wall 120 opposite the lower wall 110, a right wall 130, and a left wall 140 opposite the right wall 130. The glove box 60 may include fewer or more walls and doors. The lower wall 110 includes a first transparent panel 112. The door 90 includes a second transparent panel 92. As used herein, "transparent" refers to a material that is not opaque, and which allows at least some light to be transmitted therethrough, and includes transparent and translucent materials that can be colored or colorless. The parts of the glove box 60 identified above generally define an interior 150 of the glove box 60, and separate the interior 150 of the glove box 60 from the passenger compartment 10.

The glove box 60 includes at least one electroluminescent assembly that emits light when activated. As seen in FIG. 3, the glove box 60 includes a first electroluminescent assembly 111 on the lower wall 110, a second electroluminescent assembly 91 on the door 90, and a third electroluminescent assembly 121 on the upper wall 120. In accordance with the present disclosure, the glove box 60 can include any one or more of the first, second, and third electroluminescent assemblies, or more electroluminescent assemblies as desired. Moreover, the location of the first, second, and third electroluminescent assemblies are not particularly limited, and the locations of the first, second, and third electroluminescent assemblies as shown in FIG. 3 may be altered as desired.

The first electroluminescent assembly 111 is a sheet-like structure that includes two major light emitting surfaces (i.e. is a "two-way light emitting electroluminescent assembly" or provides "two-way illumination"), and is positioned on an inside surface of the first transparent panel 112 included on the lower wall 110. When activated, the first electroluminescent assembly 111 emits light from one major light emitting surface (i.e. upper surface opposite from the first transparent panel 112) to illuminate the interior 150 of the glove box 60, and emits light from the other major light emitting surface (i.e. lower surface facing the transparent panel 112), which is transmitted through the first transparent panel 112 and to the footwell 70 in order to illuminate the footwell 70. For this purpose a trim piece 170 provided under the glove box 60 may include a window 171 (which may comprise an aperture or transparent material) to allow light emitted from the first electroluminescent assembly 111 to reach and illuminate the footwell 70. The illumination of the interior 150 of the glove box 60 and the footwell 70 via the first electroluminescent assembly 111 thereby makes the glove box 60 and footwell 70, and objects or material that may be present therein, more visible to occupants located in the passenger compartment 10, and can allow the occupants to more easily view the glove box 60, footwell 70, and their contents in dim situations.

In one embodiment, the first electroluminescent assembly 111 is activated to emit light by movement of the door 90 between the open position and the closed position, for example, when the door 90 is in the open position. In another embodiment, the first electroluminescent assembly 111 is activated to emit light by operation of the vehicle 1, for example, when an ignition key is connected to the vehicle 1 or when the vehicle is running. In still another embodiment, the first electroluminescent assembly 111 is activated to emit light by opening of a vehicle passenger door, for example, when an occupant is entering the vehicle.

The second electroluminescent assembly 91 is a sheet-like structure that includes two major light emitting surfaces and is positioned on an inside surface of a second transparent panel 92 provided on a handle mechanism 93 of the glove box door 90. The handle mechanism 93 includes a latch 95 for securing the door 90 in the closed position (FIG. 1), a handle 94 for moving the door 90 to the open position (FIGS. 2 and 3), and a third transparent panel 96. When in the open position, the door 90 allows access to the interior 150 of the glove box 60. When in the closed position, the door 90 closes of the interior 150 from an exterior of the glove box 60. As depicted, the second transparent panel 92 is located on a front side of the handle mechanism, which front side is directed toward the interior 150 of the glove box 60 when the door 90 in in the open position. As such, when the second electroluminescent assembly 91 is activated, the second electroluminescent assembly 91 emits light from one major light emitting surface (i.e. surface opposite from the second transparent panel 92) and toward the interior 150 to thereby illuminate the interior 150 of the glove box 60. As such, light emitted from the second electroluminescent assembly 91 therefore does not shine in a face or eyes of an occupant of the vehicle 1.

Light emitted from the other major light emitting surface (i.e. surface facing the second transparent panel 92) of the second electroluminescent assembly 91, is transmitted through the second transparent panel 92, through the third transparent panel 96, and to the handle 94 in order to illuminate the handle 94 from a back side of the handle 94. When illuminated, the handle 94 is more visible to occupants located in the passenger compartment 10, and can allow the occupants to more easily locate the handle 94 in dim situations. In one embodiment, the second electroluminescent assembly 91 is activated to emit light by operation of the vehicle 1, for example, when an ignition key is connected to the vehicle 1 or when the vehicle is running. It is to be understood that electroluminescent assemblies 91 and 111 may be disposed on an outside surface of the respective transparent panels 92, 112 such that light emitted by each electroluminescent assembly illuminates a portion of the vehicle that is exterior of the storage compartment, and is transmitted through the transparent panel to thereby illuminate an interior of the glove box 60. In a further aspect, such transparent panels may have one-way light emitting electroluminescent assemblies, as opposed to a two-way light emitting electroluminescent assembly, on either of their sides such that light is emitted in two directions away from the transparent panels to the interior and exterior of the glove box 60.

The third electroluminescent assembly 121 is also a sheet-like structure that includes two major surfaces, but only one of the two major surfaces emit light when the third electroluminescent assembly 121 is activated (i.e. "one-way light emitting electroluminescent assembly"). The third electroluminescent assembly 121 is positioned on an inside surface of the upper wall 120 of the glove box 60. When the third electroluminescent assembly 121 activated, the third electroluminescent assembly 121 emits light from only one major light emitting surface (i.e. surface opposite from the upper wall 120) toward the interior 150 to thereby illuminate the interior 150 of the glove box 60. Such overhead illumination of the interior 150 of the glove box 60 thereby makes the glove box 60, and objects or material that may be present therein, more visible, and can allow the occupants to more easily view the glove box 60 and its contents in dim situations. In one embodiment, the third electroluminescent assembly 121 is activated to emit light by movement of the door 90 between the open position and the closed position, for example, when the door 90 is in the open position.

It should be appreciated that the first, second and third electroluminescent assemblies may be activated jointly or independently from one another.

Figure 4:
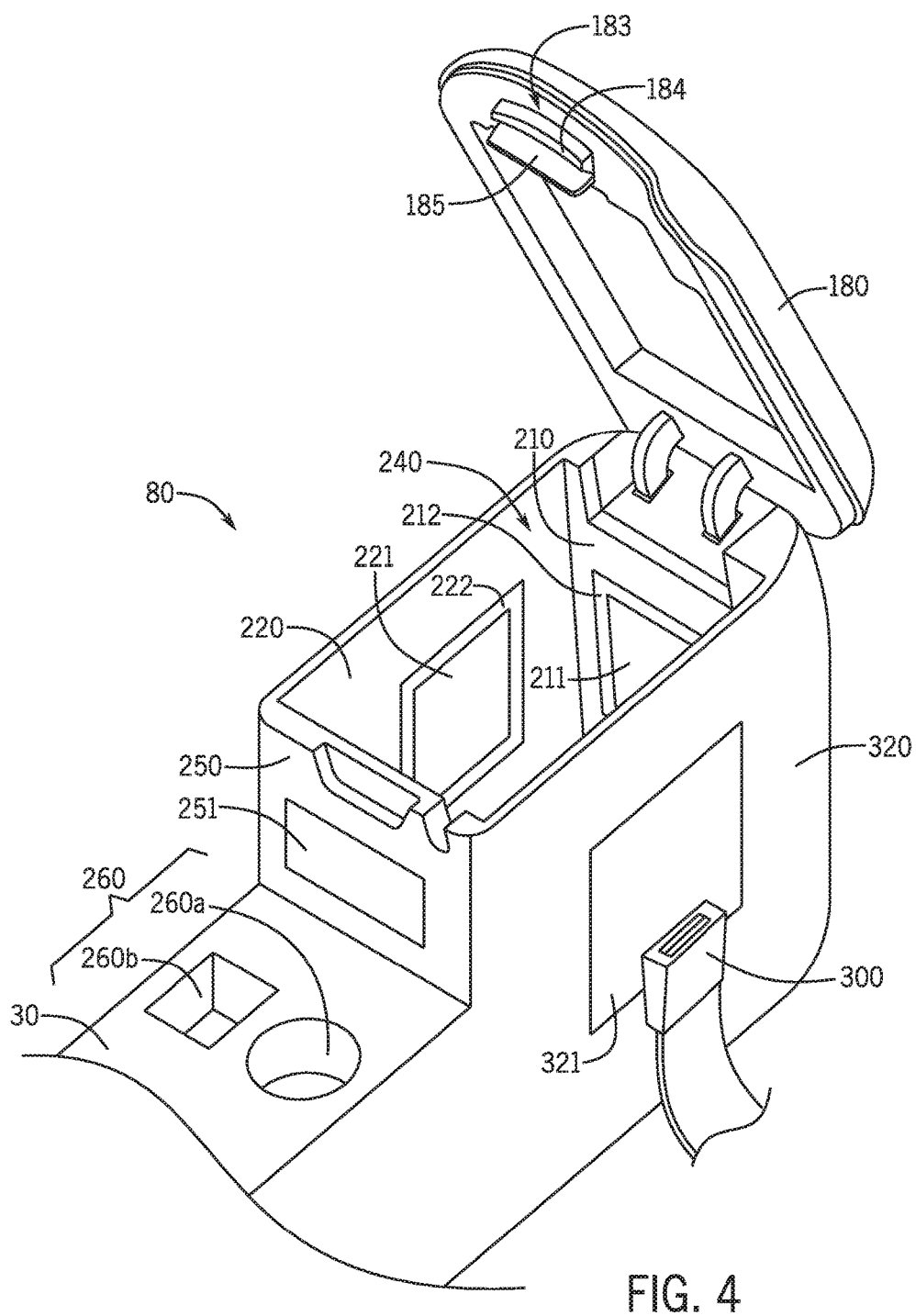
FIG. 4 is perspective view of the vehicle interior of FIG. 1 showing a center console including a center console storage compartment with its door in an open position.
Figure 5:
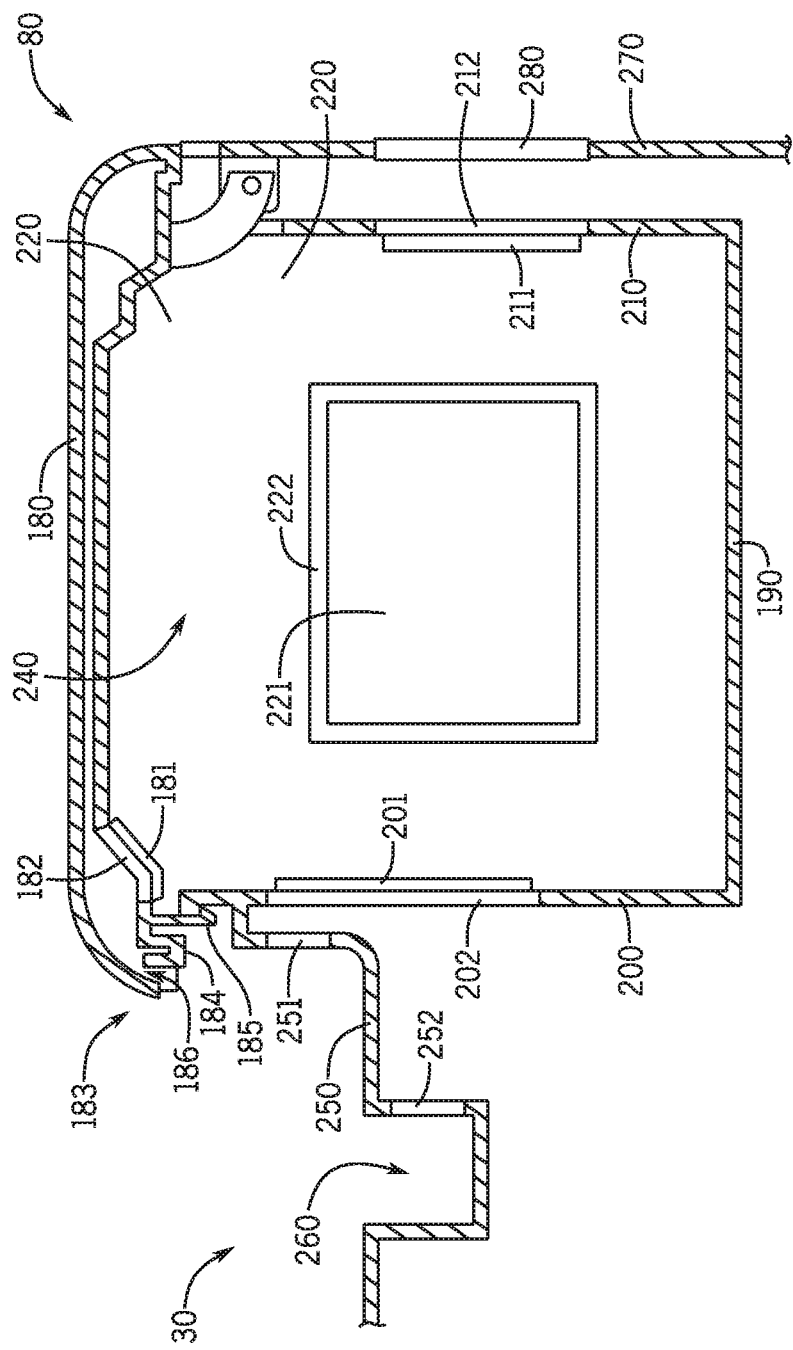
FIG. 5 is a side cross-sectional view of the center console storage compartment of FIG. 4 with the door in a closed position.
Figure 6:
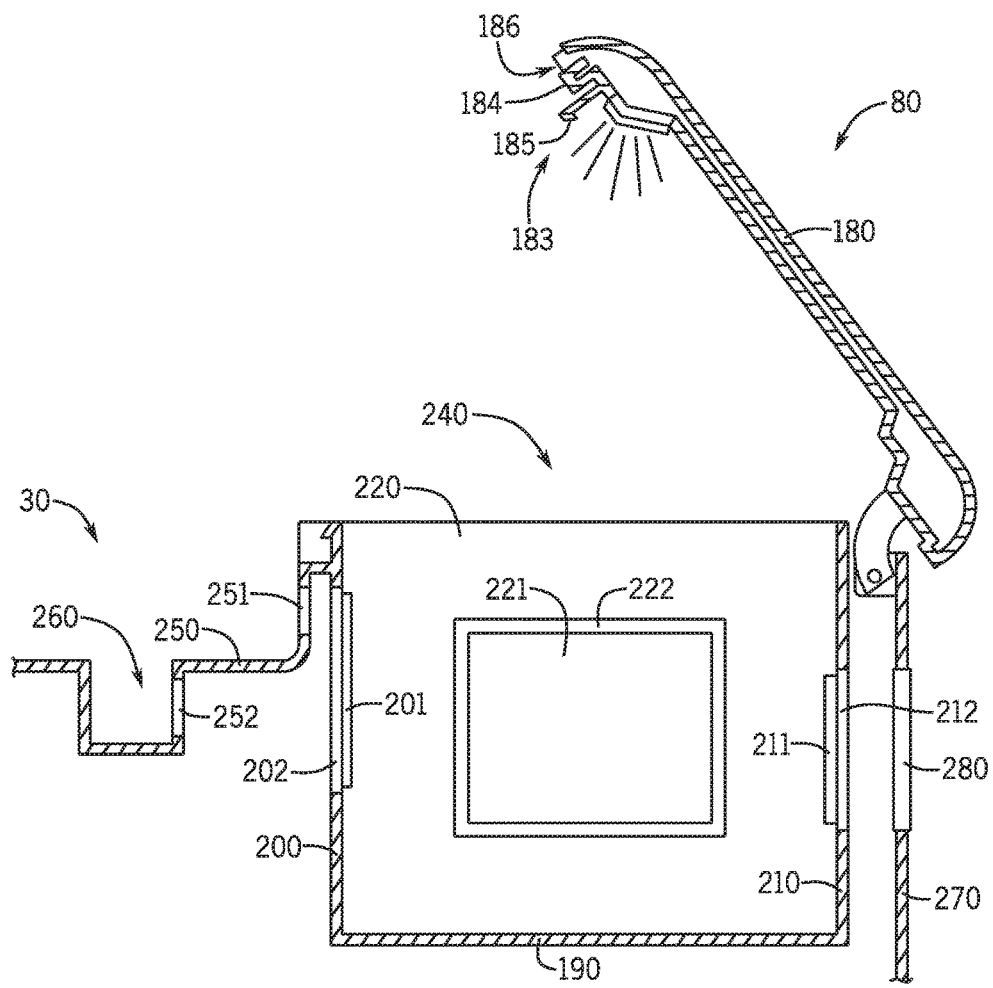
FIG. 6 is a side cross-sectional view of the center console storage compartment of FIG. 4 with the door in the open position.

With additional reference to FIGS. 4-6, the center console storage compartment 80 includes a console door 180 that is movable between an open position (FIGS. 4 and 6) and a closed position (FIGS. 1 and 5), a lower wall 190 opposite the console door 180, a front wall 200, a rear wall 210 opposite the front wall 200, a right wall 220, and a left wall opposite the right wall 220. The above parts of the center console storage compartment 80 generally define an interior 240 of the compartment 80. When in the open position, the console door 180 allows access to the interior 240, and when in the closed position, the console door 180 closes off the interior 240 from the passenger compartment 10.

The console door 180 includes a fifth console transparent panel 182, the front wall 200 includes the first console transparent panel 202, the rear wall 210 includes the second console transparent panel 212, the right wall 220 includes the third console transparent panel 222, and the left wall includes the fourth console transparent panel.

The center console storage compartment 80 includes at least one electroluminescent assembly that emits light when activated. As seen in FIGS. 4-6, the center console storage compartment 80 includes a first console electroluminescent assembly 201 on the front wall 200, a second console electroluminescent assembly 211 on the rear wall 210, a third console electroluminescent assembly 221 on the right wall 220, a fourth console electroluminescent assembly on the left wall, and a fifth console electroluminescent assembly 181 on the console door 180. In accordance with the present subject matter, the center console storage compartment 80 can include any one or more of the first, second, third, fourth, and fifth console electroluminescent assemblies, or more console electroluminescent assemblies as desired. Moreover, the location of the first, second, third, fourth, and fifth console electroluminescent assemblies are not particularly limited, and their locations as shown in FIG. 4 may be altered as desired. Although the fourth console electroluminescent assembly and the fourth console transparent panel provided on the left wall cannot be seen in FIG. 4, it will be understood that these features may be constructed similar to the corresponding respective features of the right wall 220, the third console electroluminescent assembly 221, and the third console transparent panel 222, which are shown.

The first console electroluminescent assembly 201 is a sheet-like structure that includes two major light emitting surfaces, and is positioned on an inside surface of the first console transparent panel 202 provided on the front wall 200. When activated, the first console electroluminescent assembly 201 emits light rearward from one major light emitting surface (i.e. surface opposite from the first console transparent panel 202) to illuminate the interior 240, and emits light forward from the other major light emitting surface (i.e. surface facing the first console transparent panel 202), which is transmitted through the first console transparent panel 202 and to a front component 260 in order to illuminate the front component 260. For this purpose a front trim piece 250 in front of the center console storage compartment 80 may include one or both of a front trim piece first window 251 and a front trim piece second window 252 (each of which may comprise an aperture or transparent material) to allow light emitted from the first console electroluminescent assembly 201 to reach and illuminate the front component 260. The front component 260 may comprise for example, one or more open top containers, such as a cup holder 260a and change holder 260b, or a parking brake.

The illumination of the interior 240 and the front component 260 via the first console electroluminescent assembly 201 thereby makes the center console storage compartment 80 and the front component 260, and objects or material that may be present therein, more visible to occupants in the passenger compartment 10, and can allow the occupants to more easily view and locate the center console storage compartment 80 and front component 260, and their contents in dim situations.

In one embodiment, the first console electroluminescent assembly 201 is activated to emit light by movement of the console door 180 between the open position and the closed position, for example, when the console door 180 is in the open position. In another embodiment, the first console electroluminescent assembly 201 is activated to emit light by operation of the vehicle 1, for example, when an ignition key is connected to the vehicle 1 or when the vehicle is running. In still another embodiment, the first console electroluminescent assembly 201 is activated to emit light by opening of a vehicle passenger door, for example, when an occupant is entering the vehicle.

The second console electroluminescent assembly 211 is a sheet-like structure that includes two major light emitting surfaces, and is positioned on an inside surface of the second console transparent panel 212 provided on the rear wall 210. When activated, the second console electroluminescent assembly 211 emits light forward from one major light emitting surface (i.e. surface opposite from the second console transparent panel 212) to illuminate the interior 240, and emits light rearward from the other major light emitting surface (i.e. surface facing the second console transparent panel 212), which is transmitted through the second console transparent panel 212 and to a rear component 280 in order to illuminate the rear component 280. The rear component 280 may comprise for example, an electronic connector, such as an electrical outlet, headphone jack, USB port, or the like as shown in FIG. 1. For this purpose, the rear component 280 may include a transparent portion to allow light emitted from the second console electroluminescent assembly 211 to reach and illuminate the rear component 280.

The illumination of the interior 240 and the rear component 280 via second console electroluminescent assembly 211 thereby makes the center console storage compartment 80, and objects or material that may be present therein, and the rear component 280 more visible to occupants in the passenger compartment 10, and can allow the occupants to more easily view and locate the center console storage compartment 80 and rear component 280 in dim situations. In one embodiment, the second console electroluminescent assembly 211 is activated to emit light by movement of the console door 180 between the open position and the closed position, for example, when the console door 180 is in the open position. In another embodiment, the second console electroluminescent assembly 211 is activated to emit light by operation of the vehicle 1, for example, when an ignition key is connected to the vehicle 1 or when the vehicle is running. In still another embodiment, the second console electroluminescent assembly 211 is activated to emit light by opening of a vehicle passenger door, for example, when an occupant is entering the vehicle.

The third console electroluminescent assembly 221 and the fourth console electroluminescent assembly are similarly situated and are sheet-like structures that includes two major light emitting surfaces. The third console electroluminescent assembly 221 and the fourth console electroluminescent assembly are positioned on an inside surface, respectively, of the third console transparent panel 222 provided on the right wall 220, and the fourth console transparent panel provided on the left wall. When activated, each of the third console electroluminescent assembly 221 and the fourth console electroluminescent assembly emits light from one major light emitting surface (i.e. surfaces opposite from the third console transparent panel 222 and the fourth console transparent panel, respectively) to illuminate the interior 240. Each of the third console electroluminescent assembly 221 and the fourth console electroluminescent assembly emits light from the other major light emitting surface (i.e. surfaces facing the third console transparent panel 222 and the fourth console transparent panel, respectively), which is transmitted through the third console transparent panel 222 and the fourth console transparent panel, respectively, and to a right belt buckle receptacle 290 and a left belt buckle receptacle 300, respectively. As such, the right belt buckle receptacle 290 and the left belt buckle receptacle 300 are illuminated.

For this purpose, a right trim piece 310 on the right of the center console storage compartment 80 may include a right trim piece window 311, and a left trim piece 320 on the left of the center console storage compartment 80 may include a left trim piece window 321. Such configuration allows light emitted from the third and fourth console electroluminescent assemblies to reach and illuminate the right and left belt buckle receptacles, respectively.

The illumination of the interior 240 and the right and left belt buckle receptacles via the third console electroluminescent assembly 221 and the fourth console electroluminescent assembly, makes the center console storage compartment 80, and objects or material that may be present therein, and the right and left belt buckle receptacles more visible to occupants in the passenger compartment 10, and can allow the occupants to more easily view and locate the center console storage compartment 80 and the right and left belt buckle receptacles in dim situations.

In one embodiment, the third and fourth console electroluminescent assemblies are activated to emit light by movement of the console door 180 between the open position and the closed position, for example, when the console door 180 is in the open position. In another embodiment, the third and fourth console electroluminescent assemblies are activated to emit light by operation of the vehicle 1, for example, when an ignition key is connected to the vehicle 1 or when the vehicle is running. In still another embodiment, the third and fourth console electroluminescent assemblies are activated to emit light by opening of a vehicle passenger door, for example, when an occupant is entering the vehicle. The third and fourth console electroluminescent assemblies may be activated jointly or independently from each other.

The fifth console electroluminescent assembly 181 is a sheet-like structure that includes two major light emitting surfaces, and is positioned on an inside surface of the fifth console transparent panel 182 provided on the console door 180. When activated, the fifth console electroluminescent assembly 181 emits light from one major light emitting surface (i.e. surface opposite from the fifth console transparent panel 182) to illuminate the interior 240, and emits light from the other major light emitting surface (i.e. surface facing the fifth console transparent panel 182), which is transmitted through the fifth console transparent panel 182 and to a console handle assembly 183 in order to illuminate the console handle assembly 183 from an inside of the handle assembly 183. The console handle assembly 183 includes a handle 184, a latch 185, and an opening 186. Light emitted to the console handle assembly may be transmitted through the opening 186, or through the handle 184 or latch 185, either of which may comprise transparent material or transparent portions.

As depicted in FIG. 6, when the console door 180 is in the open position, the fifth console electroluminescent assembly 181 is mounted on a lower surface of the console handle assembly 183. As such, light emitted from the fifth console electroluminescent assembly 181 is directed generally downward towards the interior 240 when the console door 180 is in the open position, and therefore does not shine in a face or eyes of an occupant of the vehicle 1. Such illumination of the interior 240 and the console handle assembly 183 thereby makes the center console storage compartment 80, and objects or material that may be present therein, and the console handle assembly 183 more visible to occupants in the passenger compartment 10, and can allow the occupants to more easily view and locate the center console storage compartment 80 and console handle assembly 183 in dim situations.

In one embodiment, the fifth console electroluminescent assembly 181 is activated to emit light by movement of the console door 180 between the open position and the closed position, for example, when the console door 180 is in the open position. In another embodiment, the fifth console electroluminescent assembly 181 is activated to emit light by operation of the vehicle 1, for example, when an ignition key is connected to the vehicle 1 or when the vehicle is running. In still another embodiment, the fifth console electroluminescent assembly 181 is activated to emit light by opening of a vehicle passenger door, for example, when an occupant is entering the vehicle.

It should be appreciated that the first, second, third, fourth, and fifth console electroluminescent assemblies may be activated jointly or independently from one another. It is to be understood that first, second, third, fourth, and fifth console electroluminescent assemblies may be disposed on an outside surface of the respective transparent panels such that light emitted by each electroluminescent assembly illuminates a portion of the vehicle that is exterior of the center console 80, and is transmitted through the transparent panel to thereby illuminate an interior of the center console 80. In a further aspect, such transparent panels may have one-way light emitting electroluminescent assemblies, as opposed to a two-way light emitting electroluminescent assembly, on either of their sides such that light is emitted in two directions away from the transparent panels to the interior and exterior of the center console 80.

Figure 7:
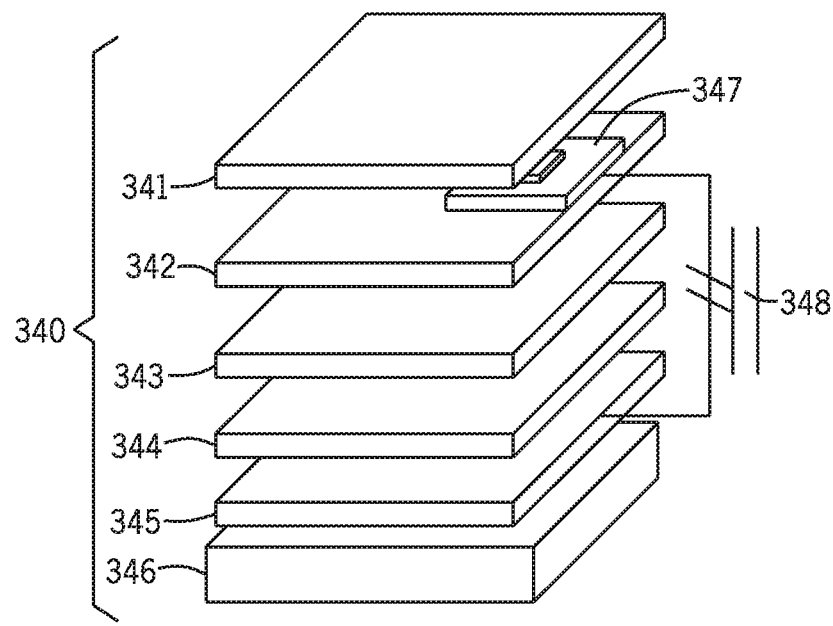
FIG. 7 is a schematic partial exploded view of a portion of one of the electroluminescent assemblies shown in FIGS. 3-6.

In a non-limiting example, the at least one electroluminescent assembly—i.e. the first, second, and third electroluminescent assemblies (111, 91, 121), and the first, second, third, fourth, and fifth console electroluminescent assemblies (201, 211, 221, 231, 181)—may be in the form of electroluminescent lamps disclosed in U.S. Pat. No. 8,470,388, the contents of which is incorporated by reference herein. With reference to FIG. 7, an exemplary schematic electroluminescent stacking arrangement 340 for each electroluminescent assembly is illustrated. As already described herein, all but the third electroluminescent assembly 121 are disposed on a transparent panel. It is to be understood that such electroluminescent assemblies can be disposed on either side of the transparent panels, or such transparent panels can have one-way light emitting electroluminescent assemblies, as opposed to a two-way light emitting electroluminescent assembly, on either of their sides.

As shown in FIG. 7, one or more top layers 341 can be provided as a transparent top coat that provides protection to each electroluminescent assembly. The one or more top layers 341 can have a total thickness of 25 microns to 125 microns. An electrically conductive top electrode 342 is provided under the one or more top layers 341. The top electrode 342 is a film coating layer that is preferably both electrically conductive and generally transparent to light. Top electrode 342 may comprise such materials as, without limitation, conductive polymers (PEDOT), carbon nanotubes (CNT), antimony tin oxide (ATO) and indium tin oxide (ITO). An illustrative commercial product is CLEVIOS™ conductive, transparent and flexible polymers (available from Heraeus Clevios GmbH of Leverkusen, Germany) diluted in isopropyl alcohol as a thinner/drying agent. CLEVIOS™ conductive polymers exhibit relatively high efficacy. In addition, CLEVIOS™ conductive polymers are based on a styrene co-polymer and thus provides a ready mechanism for chemical crosslinking/mechanical bonding with the underlying phosphor layer 343. In a non-limiting example, the top electrode 342 has a thickness of 1 to 25 microns.

A bus bar 347 is interposed between the top layer 341 and the top electrode 342. The bus bar 347 may be provided as a relatively low-impedance strip of conductive material, usually comprised of one or more of the materials usable to produce the bottom or rear electrode 345. In an illustrative example, the bus bar 347 is comprised of silver. The bus bar 347 is typically applied to the peripheral edge of the lit field. Although bus bar 347 is generally shown as on top of the top electrode 342 in the figures, the bus bar 347 may be applied adjacent to the top electrode 342, or below the top electrode 342.

Below the top electrode 342, a phosphor layer 343 is provided. Phosphor layer 343 is a semi-conductive film coating layer comprised of a material (such as metal-doped Zinc Sulfide (ZnS)) encapsulated within an electrostatically permeable polymer matrix. When excited by the presence of an alternating electrostatic field generated by an AC signal, the doped ZnS absorbs energy from the field, which it in turn re-emits as a visible-light photon upon returning to its ground state. In a non-limiting example, the phosphor layer 343 comprises about a 2:1 solution of co-polymer and dilute ammonium hydroxide. To this solution, a quantity of metal-doped ZnS based phosphors doped with at least one of copper, manganese and silver (i.e., ZnS:Cu, Mn, Ag, etc.) pre-wetted in a dilute ammonium hydroxide is added to form a supersaturated suspension. In a non-limiting example, the phosphor layer 343 comprises a thickness of 30 to 100 microns.

Below the phosphor layer 343, a dielectric layer 344 is provided that insulates the phosphor layer 343. Dielectric layer 344 may be an electrically non-conductive film coating layer comprising a material (typically Barium Titanate—$BaTiO_3$) possessing high dielectric constant properties encapsulated within an insulating polymer matrix having relatively high permittivity characteristics (i.e., an index of a given material's ability to transmit an electromagnetic field). In an illustrative example, the dielectric layer 344 comprises about a 2:1 solution of co-polymer and dilute ammonium hydroxide. To this solution a quantity of $BaTiO_3$, which has been pre-wetted in ammonium hydroxide, may be added to form a supersaturated suspension. In a non-limiting example, the dielectric layer 344 may comprise at least one of a titanate, an oxide, a niobate, an aluminate, a tantalate, and a zirconate material, among others.

Below the dielectric layer 344, a rear electrode layer 345 is provided that is electrically connected to the conductive lead 348, which is connected to a power source to thereby provide power to the electroluminescent assemblies for illumination thereof. The conductive lead 348 may comprise any of the materials that may be used for the top electrode 342 or the rear electrode 345. The rear electrode layer 345 is a film coating layer that may be a sprayable conductive material and may form the rough outline of the lit EL "field". In a non-limiting example, the rear electrode 345 may be made using a highly conductive, generally opaque material. Examples of such materials include, without limitation, an alcohol/latex-based, silver-laden solution such as SILVASPRAY™ available from Caswell, Inc. of Lyons N.Y., and a water-based latex, copper-laden solution such as "Caswell Copper" copper conductive paint, also available from Caswell, Inc., and mixtures thereof.

In a non-limiting example, the rear electrode 345 may be a metal plating wherein a suitable conductive metal material is applied to a non-conductive substrate 346 using any suitable process for the select metal plating. Example types of metal plating include, without limitation, electroless plating, vacuum metalizing, vapor deposition and sputtering. In one embodiment, the rear electrode 345 is provided on one of transparent panels 92, 112, 182, 202, 212, 222, 232, and the fourth console transparent panel, which act as the substrate 346. In another embodiment, the rear electrode 345 is provided on a transparent substrate 346, with subsequent layers being formed thereon to provide an electroluminescent assembly, and then the front electrode 341 of the electroluminescent assembly is positioned on one of the transparent panels 92, 112, 182, 202, 212, 222, 232, and the fourth console transparent panel.

The rear electrode 345 may also be an electrically conductive, generally clear transparent layer such as, without limitation, "CLEVIOS™ S V3" and or "CLEVIOS™ S V4" conductive polymers, available from Heraeus Clevios GmbH of Leverkusen, Germany. This transparent configuration for the rear electrode allows for two-way illumination.

Finally, a primer layer (not shown) may be positioned between the rear electrode 345 and the substrate 346 or the transparent panel acting as the substrate. The primer layer may be oxide-based and may serve to electrically insulate the subsequent conductive and semi-conductive layers from the substrate/transparent panel, and/or may also promote adhesion between substrate 346 or the transparent panel acting as the substrate, and subsequently applied layers. In a non-limiting example, the primer layer may be a transparent layer, such as a transparent polymeric material. Illustrative examples include polyurethane coatings such as single or two-component polyurethane systems.

Figure 8:
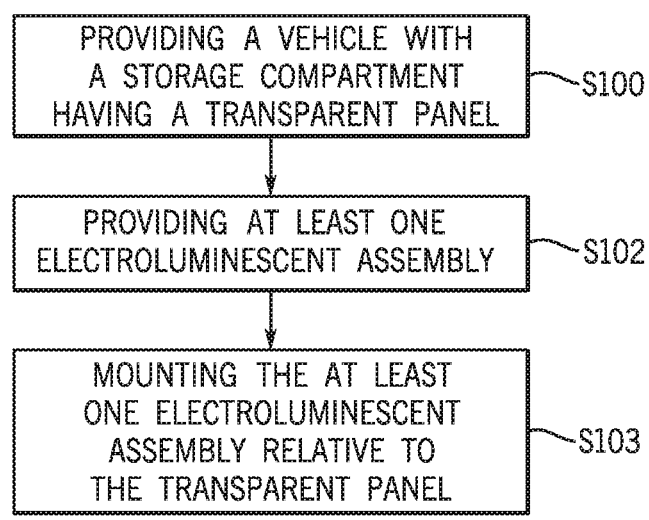
FIG. 8 is a schematic block diagram illustrating an exemplary method of installing an electroluminescent feature on a vehicle storage compartment.

With reference to FIG. 8, a schematic block diagram illustrating a method of installing an electroluminescent feature on a storage compartment of a vehicle according to an exemplary embodiment will now be discussed. The method will be described in association with the vehicle assembly discussed herein (shown in FIGS. 1-7), though this is not required and the method can be used with other vehicle assemblies.

In the method, at S100, a vehicle with a storage compartment can be provided. The storage compartment has a transparent panel (such as transparent panels 92, 112, 182, 202, 212, 222, and the fourth console transparent panel) and a door (such as doors 90, 180) that at least partially define the storage compartment. The door is movable between an open position (such as shown in FIGS. 2, 3, 4, 6) allowing access to an interior of the storage compartment (such as interiors 150, 240), and a closed position closing off the interior from an exterior of the storage compartment (such as shown in FIGS. 1 and 5).

At S102, at least one electroluminescent assembly can be provided, which has two major light emitting surfaces that are oppositely directly from each other and emit light upon activation of the at least one electroluminescent assembly (i.e. provides two-way illumination).

At S103, the at least one electroluminescent assembly (such as electroluminescent assemblies 91, 111, 181, 201, 211, 222, and the fourth console electroluminescent assembly) can be mounted relative to the transparent panel such that light emitted from the at least one electroluminescent assembly illuminates the interior of the storage compartment, and is transmitted through the transparent panel to illuminate a portion of the vehicle that is at the exterior of the storage compartment (such as footwell 70, handle 94, handle 184, front component 260, rear component 280, right and left belt buckle receptacles 290, 300).

Additionally, the conductive lead 348 of the at least one electroluminescent assembly can be electrically connected to a power source of the vehicle 1, to thereby electrically connect the at least one electroluminescent assembly to the power source. During operation, a voltage supply to the conductive lead 348 can be varied to change a brightness of the at least one electroluminescent assembly. Also, a frequency of the power supplied to the conductive lead 348 can be varied to change a color of the at least one electroluminescent assembly.

In some embodiments, the at least one electroluminescent assembly can be included in a variety of shapes, sizes, configurations, and at a plurality of locations within the storage compartments.

In an embodiment, light emitted from one of the two major light emitting surfaces of the at least one electroluminescent assembly may have different chromaticity coordinates than light emitted from the other of the two major light emitting surfaces of the at least one electroluminescent assembly, such that the color of light illuminating the interior of the storage compartment is different from the color of light illuminating the exterior of the storage compartment. For this purpose, the one or more topcoat layers 341 may include a color converting additive, such as a photoluminescent pigment, that allows the topcoat layer 341 containing the color converting additive to function as a photoluminescent color conversion layer. In a non-limiting example, the color converting additive is cerium doped YAG and the phosphor layer 343 provides a blue light source that excites the cerium doped YAG to convert a portion of the blue light to yellow light to provide a white light from one of the two major light emitting surfaces of the at least one electroluminescent assembly, while the other of the two major light emitting surfaces emits the blue light. For example, the interior of the storage compartment may be illuminated with light having a first chromaticity coordinate (e.g. a first color such as white) and the exterior of the storage compartment may be illuminated with light having a second chromaticity coordinate (e.g. a second color such as blue that is different than the first color). It is to be understood that different phosphorescent materials for the phosphor layer 343 and color converting additives for the topcoat 341 may be used to provide any desired combination of colors for illuminating the interiors and exteriors of the storage compartments.

In yet another alternate embodiment, at least one electroluminescent assembly could provide one-way illuminations (such as the third electroluminescent assembly 121) and be provided on a non-transparent surface (such as the upper wall 120 of the glove box 60), for example.

It will be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A storage compartment of a vehicle, comprising:
a transparent panel at least partially defining the storage compartment,
a door movable between an open position allowing access to an interior of the storage compartment, and a closed position; and
an electroluminescent assembly disposed on the transparent panel that emits light when activated;
wherein, light emitted by the electroluminescent assembly illuminates the interior of the storage compartment, and is transmitted through the transparent panel to thereby illuminate a portion of the vehicle that is exterior of the storage compartment.

2. The storage compartment of claim 1, wherein:
the electroluminescent assembly has two major light emitting surfaces that are oppositely directly from each other and emit light upon activation of the electroluminescent assembly;
wherein, light emitted by one of the two major light emitting surfaces illuminates the interior of the storage compartment, and light emitted by the other of the two major light emitting surfaces is transmitted through the transparent panel to thereby illuminate the portion of the vehicle that is exterior of the storage compartment.

3. The storage compartment of claim 1, wherein the electroluminescent assembly is activated to emit light by one or more of:
i) movement of the door between the open position and the closed position,
ii) a passenger being within a passenger compartment of the vehicle,
iii) operation of the vehicle,
iv) movement of a vehicle passenger door between open and closed positions, and
v) proximity of a passenger relative to the electroluminescent assembly.

4. The storage compartment of claim 1, further comprising:
a second transparent panel disposed on the door, and a second electroluminescent assembly disposed on the second transparent panel,
wherein, when the door is in the open position, the second electroluminescent assembly emits light that is directed towards the interior of the storage compartment, and when the door is in the closed position, the second electroluminescent assembly emits light through the second transparent panel to illuminate a handle assembly on the door, the illuminated handle assembly being on an outside surface of the door and facing a passenger compartment of the vehicle.

5. The storage compartment of claim 4, wherein:
the electroluminescent assembly is activated to emit light when the door of the storage compartment is in the open position, and
the second electroluminescent assembly is activated to emit light when the vehicle is operational.

6. The storage compartment of claim 4, wherein:
the storage compartment is located in a dashboard assembly of the vehicle, and
the transparent panel is located on a bottom wall of the storage compartment such that light emitted by the electroluminescent assembly is transmitted through the transparent panel to thereby illuminate a footwell in the vehicle.

7. The storage compartment of claim 6, further comprising a third electroluminescent assembly disposed on an upper interior wall of the storage compartment,
wherein the third electroluminescent assembly emits light downward to illuminate the interior of the storage compartment.

8. The storage compartment of claim 7, wherein the third electroluminescent assembly is activated to emit light when the door of the storage compartment is in the open position.

9. The storage compartment of claim 4, wherein the storage compartment is located in a center console assembly of the vehicle.

10. The storage compartment of claim 9, wherein the transparent panel is located on a front wall of the storage compartment facing a front of the vehicle such that light emitted by the electroluminescent assembly is transmitted through the transparent panel to thereby illuminate a console component in front of the storage compartment.

11. The storage compartment of claim 10, wherein the electroluminescent assembly is activated to emit light when the vehicle is operational.

12. The storage compartment of claim 9, wherein the transparent panel is located on a rear wall of the storage compartment facing a back of the vehicle such that light emitted by the electroluminescent assembly is transmitted through the transparent panel to thereby illuminate a vehicle component behind the storage compartment.

13. The storage compartment of claim 9, wherein the transparent panel is located on as side wall of the storage compartment facing towards a lateral side of the vehicle such that light emitted by the electroluminescent assembly is transmitted through the transparent panel to thereby illuminate a vehicle component at a lateral side of the storage compartment.

14. The storage compartment of claim 1, wherein light emitted from the electroluminescent assembly that illuminates the interior of the storage compartment has different chromaticity coordinates than light emitted from the electroluminescent assembly that illuminates the portion of the vehicle that is exterior of the storage compartment.

15. The storage compartment of claim 14, wherein the electroluminescent assembly includes a first face and an oppositely directed second face, the electroluminescent assembly comprising:
an electroluminescent phosphor layer including a first side and an oppositely directed second side, the first side of the electroluminescent phosphor layer being closest to the first face of the electroluminescent assembly, and
a photoluminescent layer positioned on the first side of the electroluminescent phosphor layer,
wherein, when the electroluminescent phosphor layer emits light of a first color from the first side of the electroluminescent phosphor layer and towards the photoluminescent layer, the photoluminescent layer converts light of the first color and emits light of a second color from the first face of the electroluminescent assembly,
wherein light of the second color emitted from the from the first face of the electroluminescent assembly has different chromaticity coordinates than light emitted from the second face of the electroluminescent assembly.

16. A method of installing an electroluminescent feature on a storage compartment of a vehicle, the method comprising:
providing a vehicle with a storage compartment having a transparent panel and a door movable between an open position allowing access to an interior of the storage compartment and a closed position,
providing an electroluminescent assembly having two major light emitting surfaces that are oppositely directly from each other and emit light upon activation of the electroluminescent assembly,
mounting the electroluminescent assembly relative to the transparent panel such that light emitted from the electroluminescent assembly illuminates the interior of the storage compartment, and is transmitted through the transparent panel to illuminate a portion of the vehicle that is exterior of the storage compartment.

17. The method of claim 16, wherein the electroluminescent assembly is activatable to emit light by one or more of:
i) movement of the door between the open position and the closed position,
ii) a passenger being within a passenger compartment of the vehicle,
iii) operation of the vehicle,
iv) movement of a vehicle passenger door between open and closed positions, and
v) proximity of a passenger relative to the electroluminescent assembly.

18. The method of claim 16, wherein:
a second transparent panel is disposed on the door, and
a second electroluminescent assembly is disposed on the second transparent panel,
wherein, when the door is in the open position, the second electroluminescent assembly emits light that is directed towards the interior of the storage compartment, and when the door is in the closed position, the second electroluminescent assembly emits light through the second transparent panel to illuminate a handle assembly on the door, the illuminated handle assembly being on an outside surface of the door and facing a passenger compartment of the vehicle.

19. The method of claim 16, wherein light emitted from the electroluminescent assembly that illuminates the interior of the storage compartment has different chromaticity coordinates than light emitted from the electroluminescent assembly that illuminates the portion of the vehicle that is exterior of the storage compartment.

20. The method of claim 19, wherein the two major light emitting surfaces are a first face and a second face of the electroluminescent assembly, the electroluminescent assembly comprising:
an electroluminescent phosphor layer including a first side and an oppositely directed second side, the first side of the electroluminescent phosphor layer being closest to the first face of the electroluminescent assembly, and
a photoluminescent layer positioned on the first side of the electroluminescent phosphor layer, wherein, when the electroluminescent phosphor layer emits light of a first color from the first side of the electroluminescent phosphor layer and towards the photoluminescent layer, the photoluminescent layer converts light of the first color and emits light of a second color from the first face of the electroluminescent assembly, wherein light of the second color emitted from the from the first face of the electroluminescent assembly has different chromaticity coordinates than light emitted from the second face of the electroluminescent assembly.

* * * * *